(12) United States Patent
Thevasahayam (10) Patent No.: US 9,324,997 B2
(45) Date of Patent: Apr. 26, 2016

(54) RECHARGEABLE BATTERY

(71) Applicant: EMPIRE TECHNOLOGY DEVELOPMENT LLC, Wilmington, DE (US)

(72) Inventor: Arockiadoss Thevasahayam, Chennai (IN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/946,216

(22) Filed: Nov. 19, 2015

(65) Prior Publication Data

US 2016/0079786 A1  Mar. 17, 2016

Related U.S. Application Data (62) Division of application No. 13/147,926, filed as application No. PCT/IB2011/050004 on Jan. 3, 2011, now Pat. No. 9,225,043.

(30) Foreign Application Priority Data

Nov. 19, 2010 (IN) .......................... 3484/CHE/2010

(51) Int. Cl.
*H01M 4/131* (2010.01)
*H01M 4/134* (2010.01)
*H01M 4/136* (2010.01)

(52) U.S. Cl.
CPC .............. *H01M 4/134* (2013.01); *H01M 4/131* (2013.01)

(58) Field of Classification Search
CPC ...... H01M 4/131; H01M 4/134; H01M 4/136
USPC ........................................................ 429/90
See application file for complete search history.

(56) References Cited

U.S. PATENT DOCUMENTS

| 4,092,464 A | 5/1978 | Dey et al. |
|---|---|---|
| 6,124,057 A | 9/2000 | Ito et al. |
| 7,229,717 B2 | 6/2007 | Yamaguchi et al. |

(Continued)

OTHER PUBLICATIONS

Licht et al. "Renewable Highest Capacity VB2/air Energy Storage",The Royal Society of Chemistry, 2008, 3257-3259.

(Continued)

*Primary Examiner* — Basia Ridley
*Assistant Examiner* — James Erwin
(74) *Attorney, Agent, or Firm* — Moritt Hock & Hamroff LLP; Steven S. Rubin, Esq.

(57) ABSTRACT

Technologies are generally described for a battery, a method for implementing a battery and a rechargeable battery system. In some examples, the rechargeable battery system includes a battery. The battery may include a first electrode including a tantalum component, a vanadium component and a boron component. The battery may further include a second electrode and an electrical insulator between the first and the second electrode. The battery system may include a housing, where the housing includes the first electrode, and where the housing is effective to communicate light and oxygen to the first electrode. A sensor may be disposed so as to be effective to detect a reaction of tantalum and oxygen in the housing and generate a reaction signal in response. A processor may be in electrical communication with the sensor and effective to receive the reaction signal and generate an indication based on the reaction signal.

23 Claims, 4 Drawing Sheets

(56) References Cited

U.S. PATENT DOCUMENTS

| | | |
|---|---|---|
| 2004/0051083 A1 | 3/2004 | McDonald et al. |
| 2006/0068285 A1 | 3/2006 | Yamaguchi et al. |
| 2008/0087325 A1 | 4/2008 | John et al. |
| 2008/0261094 A1 | 10/2008 | Licht et al. |
| 2009/0146604 A1 | 6/2009 | Choi et al. |

OTHER PUBLICATIONS

Raoufi et al., Surface characterization and microstructure of ITO thin films at different annealing temperatures, Applied Surface Science, 2007, 9085-9090.

Fallah et al., The effect of annealing on structural, electrical and optical properties of nanostructured ITO films prepared bye-beam evaporation, Materials Research Bulletin, 2007, 42, 487-496.

Sun et al., Preliminary photovoltaic response from a polymer containing p-vinylenephenylene amine backbone, Solar Energy Materials & Solar Cells, 2007, 91, 1289-1298.

Legnani et al., Indium tin oxide films prepared via wet chemical route, Thin Solid Films, 2007, 516, 193-197.

Stowell et al., RF-superimposed DC and pulsed DC sputtering for deposition of transparent conductive oxides, Thin Solid Films, 2007, 515, 7654-7657.

Hyeti et al., Investigation of tantalum oxide films prepared by atmosphere pressure chemical vapour deposition for use as water splitting photo-catalysts, University College of London and University of Strathclyde, 2009, 1-1.

Chen et al., Tantalum oxide-supported metal oxide ($Re_2O_7$, $CrO_3$, $MoO_3$, $WO_3$, $V_2O_5$, and $Nb_2O_5$) catalysts: 8 synthesis, Raman characterization and chemically probed by methanol oxidation, Journal of Catalysis, 2003, 217, D 468-477.

Morimitsu et al., Stability of Iridium Oxide—Tantalum Oxide Coated Titanium Electrodes for Oxygen Evolution in Alkaline Solutions, Journal of New Materials for Electrochemical Systems, 2004, 7, 323-327.

Park et al., Pl nanostructured electrode encapsulated by a tantalum oxide for thin-film fuel cell, Journal of Vacuum Science and Technology, 2004, 22(6), 2628-2631.

Morell et al., A Mathematical Model for Chemical Vapor Infiltration with Volume Heating, Journal of Electrochemical Society, 1992, 139(1), 328-336.

Baturina et al., Oxygen Reduction Reaction on Platinum/ Tantalum Oxide; Electrocatalysts for PEM Fuel Cells, Journal of the Elctrochemical Society, 2008, 155 (12) B1314-B1321.

J.M. Jehng & I.E. Wachs, The Molecular Structures and Reactivity of supported Niobium Oxide Catalysts, Catalysis Today, 1990,8,37-55.

S. Boughaba & M.U. Islam, Optical Properties of Tantalum Oxide Films Deposited on 8K7 Substrates by Excimer Laser Ablation, Materials Research Society Symposium, 2000,617, J3.7.1-J3.7.6.

Takasu et al., Oxygen reduction characteristics of several valve metal oxide eletrodes in $HClO_4$ solution, Electrochimica Acta (201 0), 10 pages.

H. Kato & A. Kudo, Energy structure and photocatalytic activity for water splitting of $Sr_2(Ta_{1-x}Nb_x)_2O_7$ solid solution, Journal of Photochemistry and Photobiology, A: Chemistry 145 (2001) 129-133.

L. Me Iying et al., Photocatalytic Water Splitting to Hydrogen over a Visible Light-Driven $LaTaON_2$ Catalyst, Chinese Journal of Catalysis, Jul. 2006, vol. 27, Issue 7, 556-558.

K. Maeda et al., Nanoparticulate precursor route to fine particles of TaON and $ZrO_2$—TaON solid solution and their photocatalytic activity for hydrogen evolution under visible light, Applied Catalysis A: General, 357 (2009) 206-212.

Y. Li et al., Electronic structure and photocatalytic properties of $A_8Si_2Ta_2O_9$ (A Y. Ca, Sr, 8a), Journal of Solid State Chemistry, 181 (2008) 2653-2659.

Prashant V. Kamat & Dan Meisel, Nanoparticles in advanced oxidation processes, Current Opinion in Colloid & Interface Science 7 (2002) 282-287.

PCT International Search Report PCT/ISA/210 for PCT/IB11/050004 dated Mar. 25, 2011.

J.Ying et al., Design and synthesis of nanostructured catalysts, Chemical Engineering Science 61 (2006) 1540-1548.

Leszek Gladczuk, Chirag Joshi, Anamika Patel, Jim Guiheen, Zalar Iqbal and Marek Sosnowski (2002). Corrosion-Resistant Tantalum Coatings for PEM Fuel Cell Bipolar Plates. MRS Proceedings, 756.

M. O. Guerrero-Perez et al., Niobium as a catalytic Promoting Agent, Recent Patents on Chemical Engineering, 2008, 1, 201-208.

Licht, S., et al., "Cathodic Chemistry of High Performance Zr Coated Materials," Chem. Commun., 4341-4343 (2006).

Bray, A.R., et al., "Photo-Induced Growth of Anodic Tantalum Pentoxide Films," Journal of Nuclear Materials, 1959, pp. 356-363, vol. 1, Issue 4.

Tanimoto, S., et al., "Investigation on Leakage Current Reduction of Photo-CVD Tantalum Oxide Films Accomplished by Active Oxygen Annealing," Journal of the Electrochemical Society, Jan. 1992, pp. 320-328, vol. 139, No. 1.

Liu, P., et al., "Eiectrochromic and Chemochromic Performance of Mesoporous Thin-Film Vanadium Oxide," Solid State Ionics, Dec. 2003, pp. 223-228, vol. 165, Issues 1-4.

RECHARGEABLE BATTERY

CROSS-REFERENCE TO RELATED APPLICATIONS

This application is a divisional under 35 U.S.C. §121 of and claims priority under 35 U.S.C. §120 to U.S. application Ser. No. 13/147,926, filed Aug. 4, 2011, now U.S. Pat. No. 9,225,043, which in turn is a U.S. National Stage filing under 35 U.S.C. §371 of International Application No. PCT/IB2011/050004, filed Jan. 3, 2011, which in turn claims priority under 35 U.S.C. §119(a) to India Application No. 3484/CHE/2010, filed Nov. 19, 2010. The entirety of each of these applications is incorporated by reference.

BACKGROUND

Unless otherwise indicated, the materials described in this section are not prior art to the claims in this application and are not admitted to be prior art by inclusion in this section.

A battery may be used to store energy. Some batteries may be disposed after their stored energy is expended. The replacement of expended batteries with new batteries can result in undesirable waste and cost. To deal with this issue, some batteries have been created to be rechargeable. Rechargeable batteries tend to have limited use periods.

SUMMARY

In one example, a battery is generally described. The battery may include a first electrode including a tantalum component, a vanadium component and a boron component. The battery may further include a second electrode and an electrical insulator between the first electrode and the second electrode.

In one example, a method of implementing a battery is generally described. The method may include combining a tantalum component, a vanadium component and a boron component to form a first electrode. The method may further include placing an insulator in between the first electrode and a second electrode.

In one example, a rechargeable battery system is generally described. In some examples, the rechargeable battery system includes a battery, a housing, a sensor, and a processor. The battery may include a first electrode including a tantalum component, a vanadium component and a boron component, a second electrode and an electrical insulator between the first electrode and the second electrode. The housing may include the first electrode. The housing may be effective to communicate light and oxygen to the first electrode. The sensor may be disposed so as to be effective to detect a reaction of the tantalum component and oxygen in the housing. The sensor may be effective to generate a reaction signal in response to the reaction. The processor may be in communication with the sensor. The processor may be effective to receive the reaction signal and generate an indication based on the reaction signal.

The foregoing summary is illustrative only and is not intended to be in any way limiting. In addition to the illustrative aspects, examples, and features described above, further aspects, examples, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DETAILED DESCRIPTION

The following detailed description contains reference to the accompanying drawings, that may form a part hereof. The drawings contain similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented. It will be readily understood that the aspects of the present disclosure, as generally described, and illustrated in the Figures, can be arranged, substituted, combined, separated, and designed in a wide variety of different configurations, all of which are explicitly contemplated.

This disclosure is generally drawn, inter alia, to methods, apparatus, systems, devices, and computer program products related to a rechargeable battery.

Briefly stated, technologies are generally described for a battery, a method for implementing a battery and a rechargeable battery system. In some examples, the rechargeable battery system includes a battery. The battery may include a first electrode including a tantalum component, a vanadium component and a boride component. The battery may further include a second electrode and an electrical insulator between the first and the second electrode. The battery system may include a housing, where the housing includes the first electrode, and where the housing is effective to communicate light and oxygen to the first electrode. A sensor may be disposed so as to be effective to detect a reaction of tantalum and oxygen in the housing and generate a reaction signal in response. A processor may be in electrical communication with the sensor and effective to receive the reaction signal and generate an indication based on the reaction signal.

Figure 1:
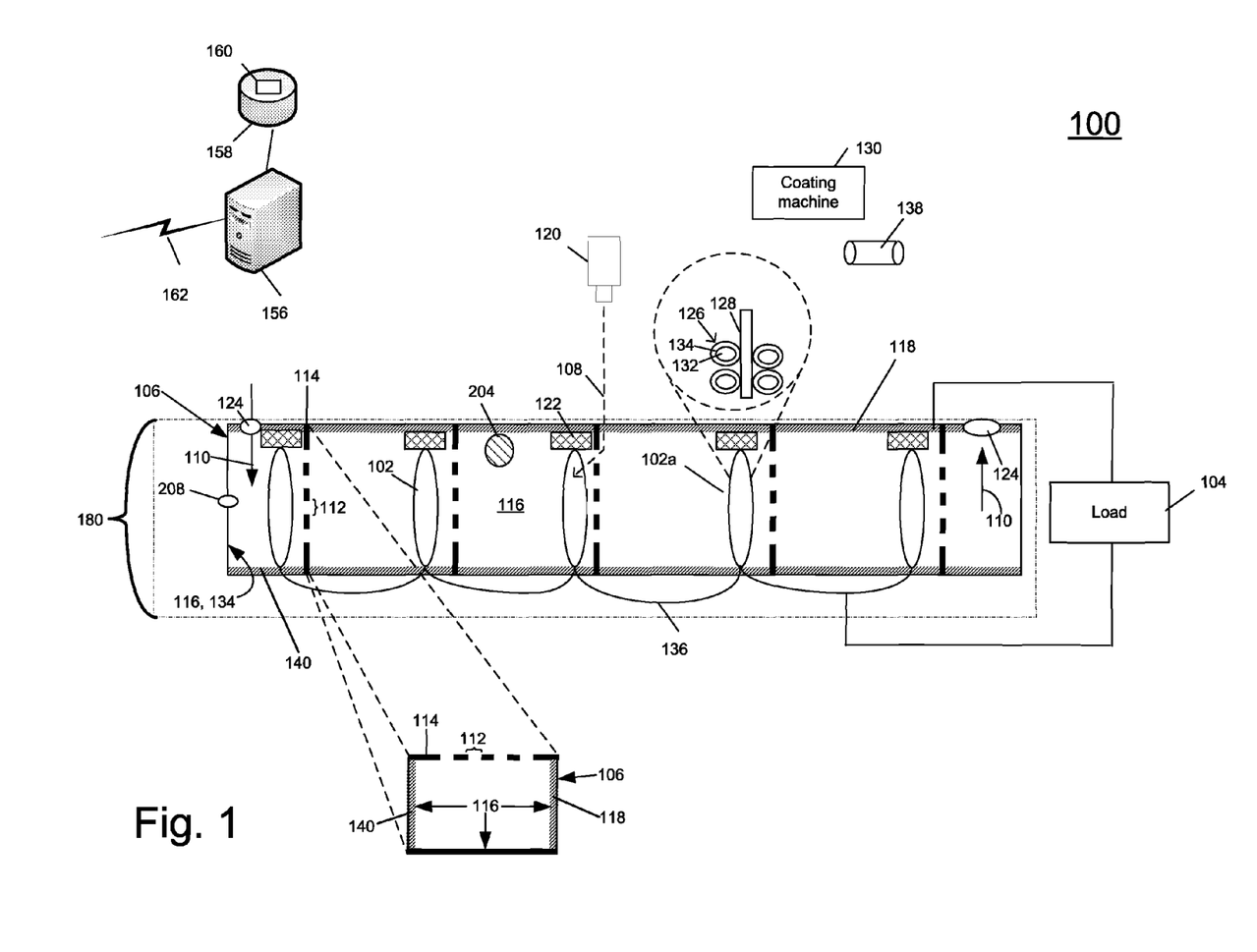
FIG. 1 is a side view of an example of a battery system.

FIG. 1 is a side view of an example of a battery system 100 arranged according to at least some embodiments described herein. An example battery system 100 may include a battery 180 in housing 106. Housing 106 may include an electrode 140 including one or more electrode components 102. Housing 106 may further include an electrode 118. Housing 106 may include walls 114 which may define holes 112 in optical communication with electrode components 102. Holes 112 may be effective to allow light 108 from a light source 120, in communication with housing 106, to be exposed to electrode components 102 as is explained in more detail below. An electrical insulator 122 may be placed between electrode component 102 and electrode 118 in housing 106. Electrode components 102 may be connected through an electrical conductor 136. Housing 106 may further include walls defining holes 124 effective to allow air 110 to flow into and out of housing 106. Battery system 100 may further include a sensor 204, and/or or a valve 208. Battery 180 may include electrode 140, electrode 118 and/or insulator 122.

At least some of these elements may be arranged in communication with a processor 156 through a communication link 162. In some examples, processor 156 may be adapted to be in communication with a memory 158 that includes instructions 160 stored therein. Processor 156 may be configured, such as by instructions 160, to control at least some of the operations described below.

An example of electrode component 102 may be an anode where oxidation occurs. Another example of electrode component 102 may be a cathode where reduction occurs. In some examples, battery system 100 may be arranged so as to generate voltage across and/or a current through a load 104. Electrode 118 may be either a cathode or an anode. In an example electrode 140 is an anode and electrode 118 is a cathode.

As shown in the magnified view of electrode component 102a, some examples of electrode component 102 may include a tantalum vanadium boride component 126 disposed on a substrate 128. Substrate 128 may be of any material. In an example, substrate 128 may be made of steel and may include channels effective to receive component 126. Component 126 may include tantalum vanadium boride 132 coated with an indium tin oxide coating 134. In some examples, component 126 may be doped on substrate 128. Component 126 may include a vanadium component such as a vanadium metal and/or vanadium oxides. Component 126 may include a combined vanadium component and boride component which may include $VB_2$. Component 126 may include a tantalum component such as a tantalum metal and/or a tantalum oxide or tantalum pentaoxide. Some examples of component 126 may include a boride component such as boron and boron oxides. Some examples of the vanadium component and/or tantalum component and/or boride component may each include particles having a particle size of about 500 nm to about 1 µm.

In some examples, indium tin oxide coating 134 may be applied using a coating machine 130. Coating machine 130 may include a dip coating machine, a spin coating machine, and/or a sputtering machine such as DC magnetron sputtering machine. Some other examples of coating machine 130 may include an RF magnetron sputtering, thermal evaporation machine, an ion beam sputtering machine, a pulsed laser deposit ion machine, a sol-gel process machine, a wet chemical route machine, etc. Coating machine 130 may be adapted to melt the indium tin oxide coating material by heating the indium tin oxide coating material to a temperature of from about 475° C. to about 525° C.

An example of the indium tin oxide coating material may include indium oxide and tin oxide, such as $In_2O_3$ and/or $SnO_2$. Some examples of amounts of indium oxide and tin oxide may include a 9:1 ratio of indium oxide to tin oxide. In an example, the indium tin oxide may include $In_2O_3$ present in an amount of about 90 percent weight and $SnO_2$ may be present in an amount of about 10 percent weight.

Some examples of making indium tin oxide coating material 134 may include cutting indium oxide material and tin oxide material into pieces of from about 1500 nm to about 50000 nm. In some examples, the pieces of indium oxide and tin oxide may be placed into a container such as a quartz tube 138. Container 138 may be closed with a vacuum and the pieces may be annealed for about 12 hours to about 30 hours at a temperature of from about 475 to about 525 degrees Celsius. In one example, the annealed product indium tin oxide material can then be removed from container 138 and coated on tantalum vanadium boride 132.

In an example, the tantalum component, vanadium component and boride component can be coated with indium tin oxide coating 134 when these components are separate individual components. Thereafter, the coated tantalum component, vanadium component and boride component may be combined into a mixture to form electrode component 102.

In an example, the tantalum, vanadium and boride components may be combined as particles together, in a mixture. The mixture may thereafter be coated with indium tin oxide 134.

Some examples of forming tantalum vanadium boride component 126 may include combining inorganic metals. Some examples of forming tantalum vanadium boride component 126 may include doping a combination of a vanadium component and a boride component with a tantalum component. Some examples of doping a combination of a vanadium component and boride component with a tantalum component may include mixing of these components together by crushing the components and mixing the crushed components into a paste in an inert atmosphere. The paste may then be packed into any desirable form to form tantalum vanadium boride component 126. Some examples of shapes and/or configurations of tantalum vanadium boride component 126 may include sheets, rods, cones, ellipses, cubes, rectangles, pins, and the like.

One example of the amount of each of tantalum component, vanadium component, and boride component are such that they can be present as a ratio of from about 1:1:4 to about 3:3:6 respectively. Some examples of such a ratio can be about 2:2:5 or about 5:5:5 of Vn:Ta:B.

In some examples, battery housing 106 may include one or more internal surfaces 116 that may be coated with indium tin oxide coating 134. Some examples of the indium tin oxide coating may be the same or different indium tin oxide coating material used to coat tantalum vanadium boride 132. In one example the technique of coating at least one of the internal surfaces 116 may be the same and/or different technique used to coat vanadium boride component, tantalum component or boride component described above.

In an example, battery system 100 may be effective to generate an electrochemical potential and/or electrical discharge. For example, battery system 100 may be effective to generate an electrochemical potential of about 0.5V to about 230 V.

Among other possible benefits, a battery system in accordance with the disclosure may produce a lower level of corrosive byproduct than other systems. Examples of a corrosive byproduct that may be produced may be the anhydride salts of boric acid ($H_3BO_3$) and vanadic acid ($H_3VO_4$). Such corrosive byproducts of a battery system 100 can include cations containing $B_2O_3$ and $V_2O_5$ species in an alkali hydroxide solvent. Hydrogen gas may also be a corrosive byproduct. In one example, the battery system 100 described herein may decrease the production of such corrosive byproducts. Without wishing to be bound to any particular theory, it has been discovered unexpectedly that the tantalum component when combined with vanadium component and boron component, can decrease the production of corrosive byproducts such as those described. In addition, it has been unexpectedly discovered that battery system 100 can be recharged by exposing electrode component 102 to light 108 as is described in more detail below.

Battery system 100 may provide an easily adoptable process for making electrically rechargeable batteries that do not require the removal of either a spent anode or a spent electrolyte. The indium oxide coating may further decrease the production of corrosive byproducts and allow light to be incident upon the tantalum vanadium boride component.

Some examples of reactions in battery system 100 with oxygen from air 110 may be as follows:

$$VB_2 + 2O_2 \rightarrow VO_2 + B_2O_3 \ \Delta Hr = -1700 \ KJ/mole \tag{1}$$

$$2VB_2 + 5O_2 \rightarrow V(BO_2)_4 + VO_2 \ \Delta Hr = -727.1 KJ/mole \tag{2}$$

$$2VB_2 + 2O_2 + Ta \rightarrow V^* + TaO^* + B_2O_3 \ \Delta Hr = -1179.1 \ KJ/mole \tag{3}$$

$$V^* + TaO^* + B_2O_3 + 2O_2 \rightarrow VB_2 + Ta_2O_5 \ \Delta Hr = 732.8 \ KJ/mole \tag{4}$$

$$VB_2 + Ta_2O_5 + 2O_2 \rightarrow V^* + TaO^* + 4O_2 \ \Delta Hr = 540.2 \ KJ/mole \tag{5}$$

In some examples, $B_2O_3$, generated in reaction (1) and (4), may be a corrosive material. Boride corrosion may result in a chemical loss of the electrochemical capacity, evolved hydrogen may be flammable, and the evolved hydrogen can swell or even crack a battery.

In addition $VO_2$ and $V(BO_2)_4$ generated in reactions (1) and (2) may also be corrosive byproducts. One example of how the present disclosure provides for a significant unexpected advantage, is the use of a tantalum component in reactions (3)-(5) above that may be used to consume corrosive $B_2O_3$ byproduct and to inhibit the formation of corrosive byproducts $VO_2$ and $V(BO_2)_4$. In one example of battery system 100, the indium tin oxide coating material may be a chemically inert material which prevents corrosion of the housing 106 that may occur from $B_2O_3$ or $VO_2$ and $V(BO_2)_4$. In some examples, the indium tin oxide coating material conducts electrons generated in the above noted reactions 3-5 to a point where load 104 may be connected.

In some examples, the tantalum component may prevent the formation of $VO_2$. In one example of battery system 100, as the tantalum component may have a greater affinity for oxygen than vanadium, $TaO_2$ may be formed, thereby releasing vanadium to recombine with boron. In this example, a continuous electrochemical reaction may proceed in the presence of air. In these examples, these reactions also prevent formation of corrosive borate.

In one example of battery system 100, electrochemical reactions 3-5 continue as long as the tantalum component surface oxygen vacancies (SOV's) sites are available for bonding with oxygen in air 110. In one example of battery system 100, the tantalum component initiates the redox reaction where $V_2O_5$ is reduced and Ta reacts with oxygen to produce tantalum oxide and electrons as shown by the reactions 6 and 7 below.

$$TaO_2 + O \rightarrow TaO^* + O_2 \tag{6}$$

$$Ta + O_2 \ (air) \rightarrow TaO_2 + 2e- \tag{7}$$

In some examples, over time, the chemical energy or the discharge potential of battery system 100 reduces gradually as the availability of SOV's in the tantalum component decreases. In one example of battery system 100, once these SOV's are at least partially occupied by oxygen, electrode components 102 may be recharged.

In some examples, light 108 may be used to recharge battery system 100. Some examples of light source 120 may include visible light, such as sunlight, ultraviolet light, or light from a high beam light emitting diode (HB LED) source. In one example of battery system 100, the tantalum component can be a photocatalytic tantalum component such that, electrode component 102 can be recharged through exposure to light 108. In one example of battery system 100, a photocatalytic tantalum component may be used to enable the conversion of vanadium oxide to vanadium boride when the tantalum component is exposed to light 108 as is explained in more detail below.

In one example, $TaVB_2$ may be regenerated from exposure of $Ta_2O_5$ to light, such as light at 632 nm wavelength, as shown in chemical reaction (8) below. In one example, $Ta_2O_5$ may release oxygen in the presence of a non-oxygen atmosphere such as nitrogen gas atmosphere or in an inert gas flow chamber or a vacuum. In one example, $TaVB_2$ may be regenerated from exposure of $TaO_xN_y$ to UV light of 282 nm wavelength as shown in chemical reaction (9) shown below.

$$Ta_2O_5 + h\gamma \ (632 \ nm) \rightarrow Ta^* + O_2(g) \tag{8}$$

$$TaO_xN_y + h\gamma \ (282 \ nm) \rightarrow Ta^* + O_2(g) \tag{9}$$

In some examples battery 180 may provide for the chemical regeneration of $VB_2$, shown in below chemical reaction (10). $Ta_2O_5$ formed during the reaction can be regenerated to Ta by the above described photocatalytic process in an inert atmosphere or through a vacuum.

$$2B_2O_3 + 2V_2O_5 + 6Ta \rightarrow 2VB_2 + 3Ta_2O_5 + \frac{1}{2}O_2 \tag{10}$$

Some examples of sensor 204 may include at least one of a pressure sensor, an oxygen sensor, or a flow sensor. Sensor 204 may be adapted to detect a reaction of tantalum and oxygen in housing 106. In some examples, sensor 204 may be effective to detect a pressure gradient, or absence thereof, within housing 106 and generate an electric signal in response. Some examples of a pressure gradient within housing component 106 may be a difference in pressure between housing 106 and the atmospheric pressure surrounding housing 106.

In some examples of battery system 100, while battery 180 is generating current, air 110 may be fed into housing 106 resulting in a first pressure gradient. In these examples, oxygen in air 110 may be consumed by tantalum and vanadium in electrode component 102. The pressure gradient may change after at least some of the SOV's of the tantalum component of electrode component 102 are occupied. Sensor 204 may be adapted to produce an electrical signal upon detecting the change in pressure gradient above a threshold. Sensor 204 may be configured to send the signal to processor 156. Processor 156 may be configured to receive the signal and generate a recharge signal, such as a light, indicating that a charge of battery 180 is below a threshold. As discussed above, in some examples, battery system 100 may be recharged by exposing electrode components 102 to light 108.

Figure 2:
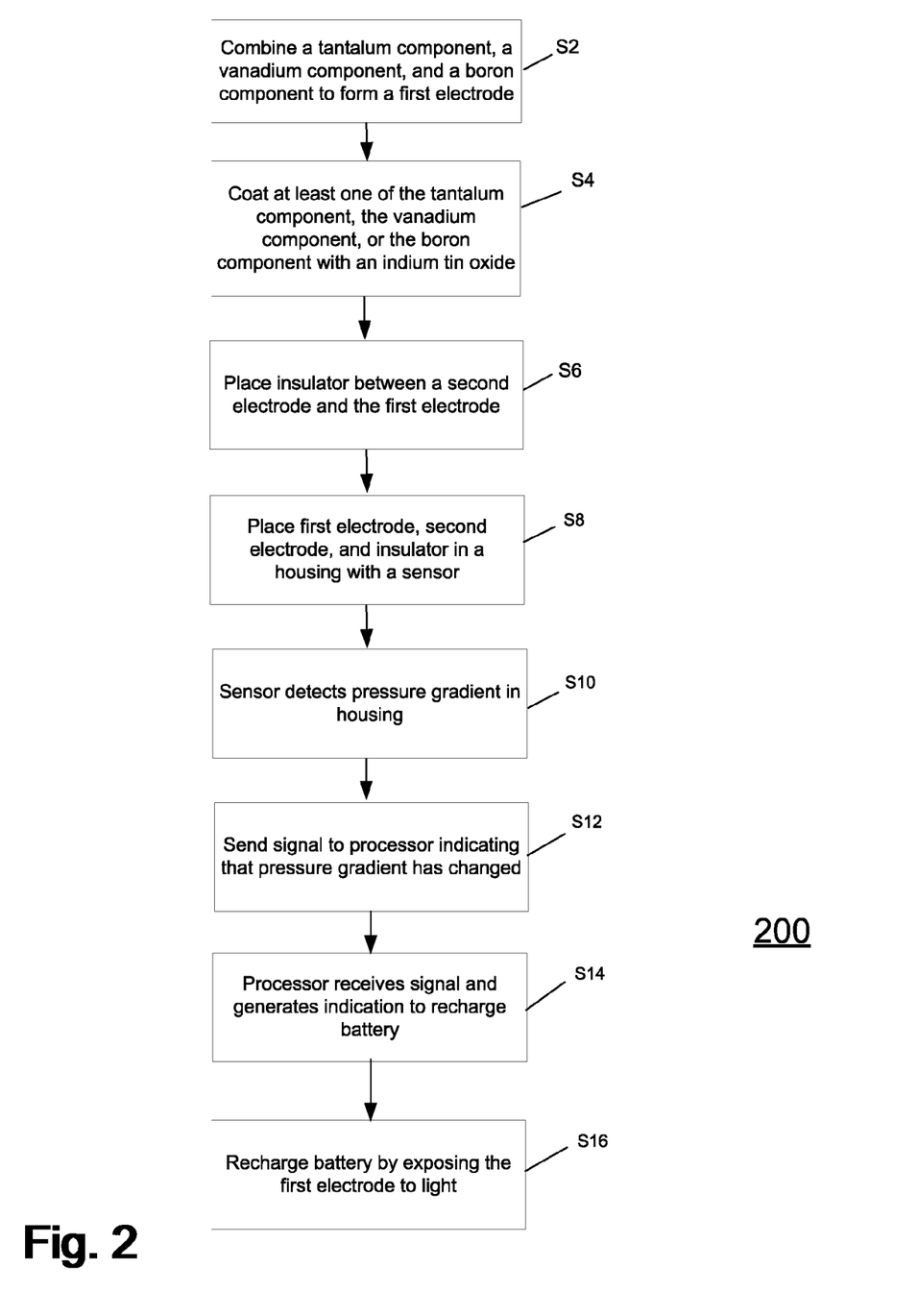
FIG. 2 depicts a flow diagram for an example process for implementing a battery.

FIG. 2 depicts a flow diagram for an example process 200 for implementing a battery in accordance with at least some embodiments described herein. The process in FIG. 2 could be implemented using, for example, system 100 discussed above. An example process may include one or more operations, actions, or functions as illustrated by one or more of blocks S2, S4, S6, S8, S10, S12, S14 and/or S16. Although illustrated as discrete blocks, various blocks may be divided into additional blocks, combined into fewer blocks, or eliminated, depending on the desired implementation. Processing may begin at block S2.

At block S2, a battery may be implemented by combining a tantalum component, a vanadium component, and a boron component to form a first electrode. For example, the tantalum component, vanadium component and boron component may be crushed and combined into a paste. Processing may continue from block S2 to block S4.

At block S4, at least one of the tantalum component, vanadium component, or boron component may be coated with an indium tin oxide coating. Processing may continue from block S4 to block S6.

At block S6, an insulator may be placed between a second electrode and the first electrode. Processing may continue from block S6 to block S8.

At block S8, the first electrode, the second electrode and the insulator may be placed in a housing. In some examples, the housing may be effective to communicate light and air to the first electrode. Processing may continue from block S8 to block S10.

At block S10, a sensor in the housing may be adapted to detect a pressure gradient in the housing. Processing may continue from block S10 to block S12.

At block S12, in examples where the change in pressure gradient is above a threshold, the sensor may be adapted to send a signal to a processor. The signal may indicate that the pressure change is above the threshold. Processing may continue from block S12 to block S14.

At block S14, the processor may be configured to receive the signal from the sensor and generate an indication that the battery should be recharged. For example, the processor may be configured to generate a light indicating that the battery should be recharged. Processing may continue from block S14 to block S16.

At block S16, in response to the indication from the processor, the battery may be recharged by exposing the first electrode to light.

Figure 3:
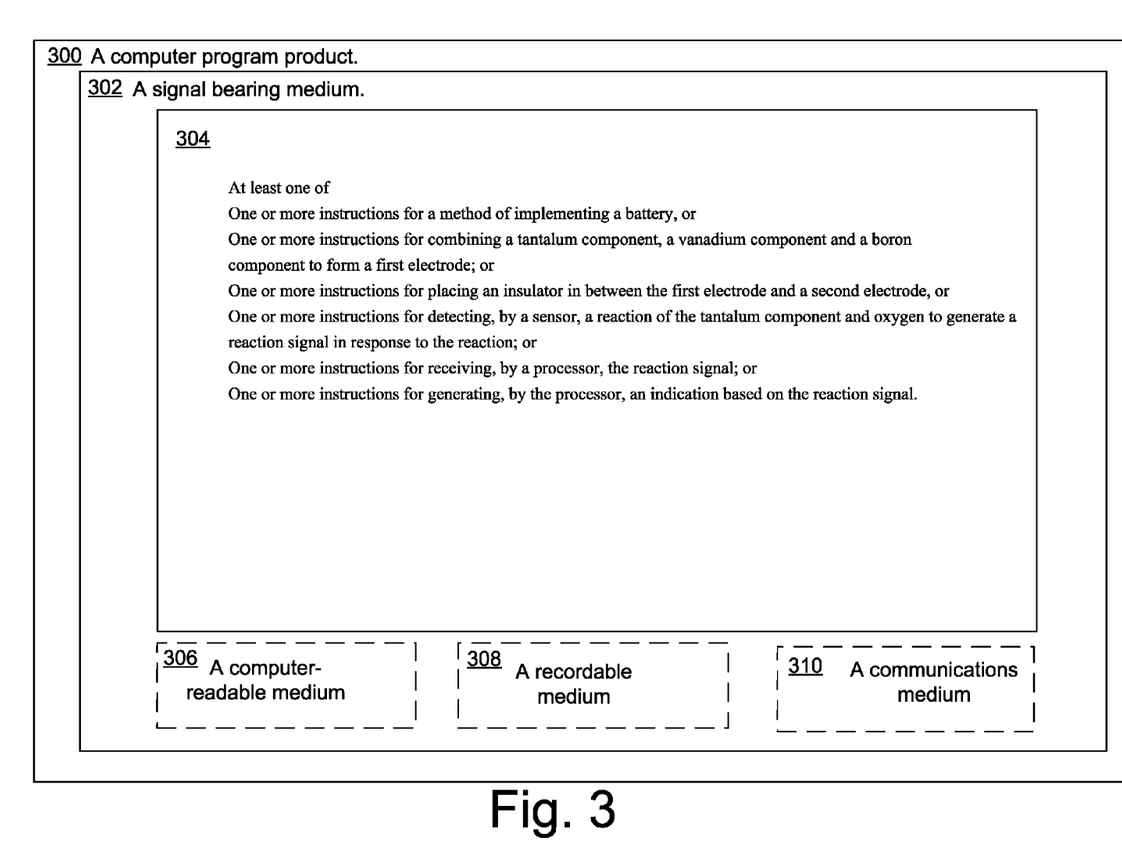
FIG. 3 illustrates a computer program product that can be utilized to implement a battery.

FIG. 3 illustrates a computer program product 300 that can be utilized to implement a battery arranged in accordance with at least some embodiments described herein. Computer program product 300 may include a signal bearing medium 302. Signal bearing medium 302 may include one or more instructions 304 that, when executed by, for example, a processor, may provide the functionality described above with respect to FIGS. 1 and 2. Thus, for example, referring to system 100, processor 156 may undertake one or more of the blocks shown in FIG. 3 in response to instructions 304 conveyed to the system 100 by signal bearing medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, computer program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

Figure 4:
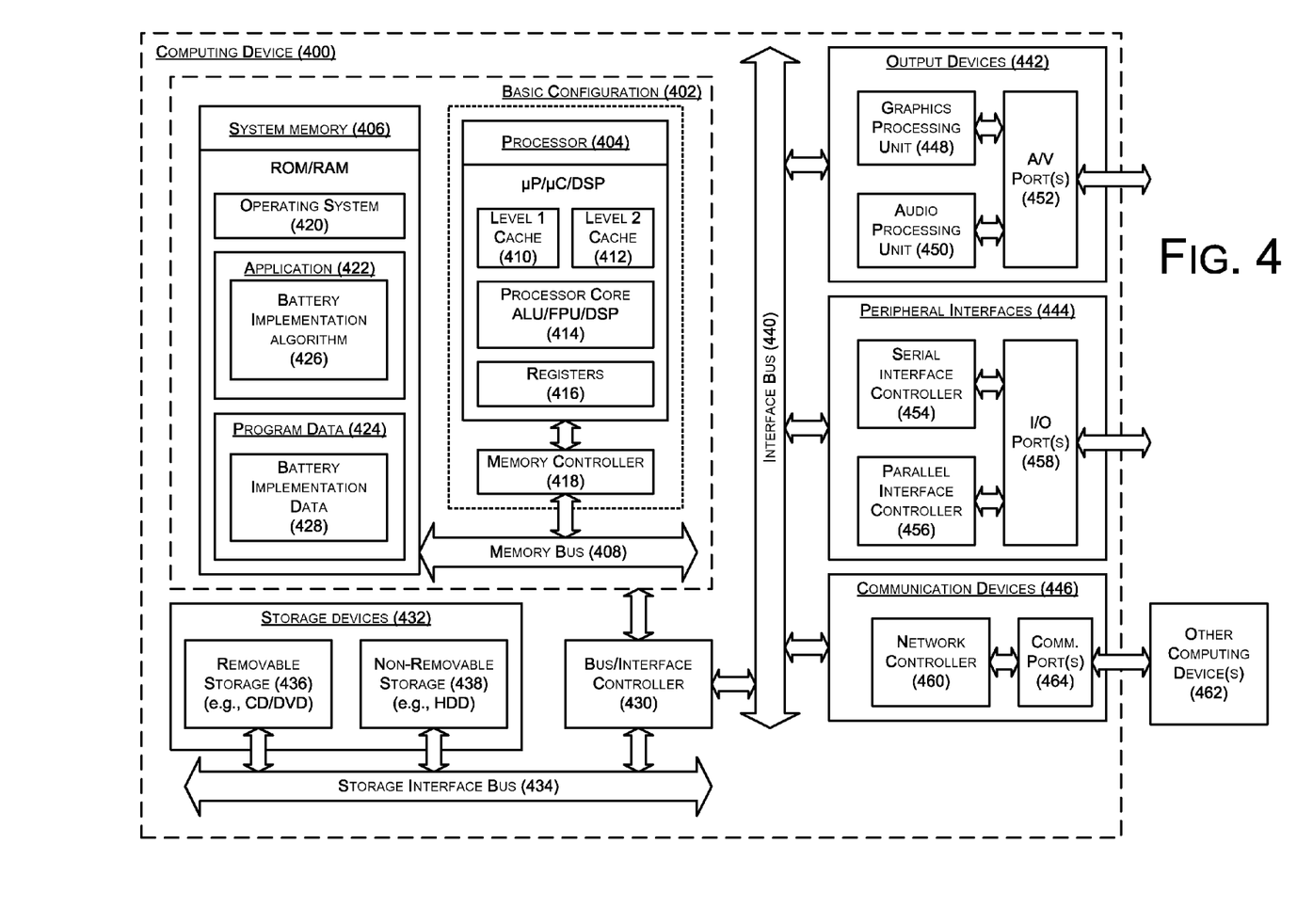
FIG. 4 is a block diagram illustrating an example computing device that is arranged to implement a battery, all arranged according to at least some embodiments described herein.

FIG. 4 is a block diagram illustrating an example computing device that is arranged to implement of a battery according to at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a battery implementation algorithm 426 that is arranged to perform the functions as described herein including those described with respect to system 100 of FIG. 1. Program data 424 may include battery implementation data 428 that may be useful for implementing a battery as is described herein. In some embodiments, application 422 may be arranged to operate with program data 424 on operating system 420 such that implementing a battery may be provided. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A rechargeable battery system, comprising:
a battery that includes:
a first electrode, wherein the first electrode includes a tantalum vanadium boron component and wherein the first electrode is effective to react with oxygen to produce at least one electron;
a second electrode;
an insulator between the first electrode and the second electrode;
a housing, wherein the housing includes the first electrode, and wherein the housing is effective to communicate light and oxygen to the first electrode;
a sensor disposed so as to be effective to detect a reaction of the tantalum vanadium boron component and oxygen in the housing, the sensor effective to generate a reaction signal in response to the reaction; and
a processor in communication with the sensor, wherein the processor is effective to receive the reaction signal and generate an indication based on the reaction signal,
wherein the indication indicates whether a charge of the battery is below a threshold.

2. The system as recited in claim 1, wherein at least one of internal surfaces of the housing is at least partially coated with an indium tin oxide.

3. The system as recited in claim 1, wherein the tantalum vanadium boron component is at least partially coated with indium tin oxide.

4. The system as recited in claim 1, wherein the sensor includes at least one of an oxygen sensor, a pressure sensor, or a flow sensor.

5. The system as recited in claim 1, wherein the tantalum vanadium boron component is effective to react with the oxygen to produce tantalum oxide, the system further comprising a light source in communication with the housing, where the housing is effective to communicate light from the light source to the tantalum oxide, and the light is effective to disassociate the oxygen from the tantalum vanadium boron component.

6. The system as recited in claim 1, wherein amounts of tantalum, vanadium, and boron in the tantalum vanadium boron component are in a ratio of from 1:1:4 to 3:3:6 respectively.

7. The system as recited in claim 1, wherein the tantalum vanadium boron component includes $TaVB_2$.

8. The system as recited in claim 1, wherein the tantalum vanadium boron component includes a vanadium oxide.

9. The system as recited in claim 1, wherein the tantalum vanadium boron component includes a tantalum oxide.

10. The system as recited in claim 1, wherein the tantalum vanadium boron component includes a boron oxide.

11. The system as recited in claim 1, wherein the first electrode includes more than one electrode component and the more than one electrode components are connected together by an electrical conductor.

12. A rechargeable battery system, comprising:
a battery that includes:
a housing, wherein at least one of internal surfaces of the housing is at least partially coated with an indium tin oxide and the housing has a first side and a second side opposite to the first side, the first side including a first electrode and the second side including a second electrode, wherein the housing further includes first walls and second walls, wherein the first walls define first holes effective to enable light from a light source to be exposed to the first electrode and the second walls define second holes effective to enable air to flow into and out of the housing;
the first electrode, wherein the first electrode includes a $TaVB_2$ component and wherein the first electrode is effective to react with oxygen in the air in the housing to produce at least one electron;
an insulator between the first electrode and the second electrode;
a sensor disposed so as to be effective to detect a reaction of the $TaVB_2$ component and oxygen in the housing, the sensor effective to generate a reaction signal in response to the reaction; and
a processor in communication with the sensor, wherein the processor is effective to receive the reaction signal and generate an indication based on the reaction signal.

13. The system of claim 12, wherein the first electrode includes more than one electrode component and the more than one electrode components are connected together by an electrical conductor.

14. The system as recited in claim 12, wherein the indication indicates whether a charge of the battery is below a threshold.

15. The system as recited in claim 12, wherein the $TaVB_2$ component is at least partially coated with indium tin oxide.

16. The system as recited in claim 12, wherein the sensor includes at least one of an oxygen sensor, a pressure sensor, or a flow sensor.

17. A rechargeable battery system, comprising:
a light source configured to provide light to a battery that includes a housing, wherein at least one of internal surfaces of the housing is at least partially coated with an indium tin oxide and the housing has a first side and a second side opposite to the first side, wherein the first side includes a first electrode and the second side includes a second electrode, wherein the housing further includes first walls and second walls, wherein the first walls define first holes effective to enable the light from a light source to be exposed to the first electrode and the second walls define second holes effective to enable air to flow into and out of the housing, wherein the first electrode includes a tantalum vanadium boron component and wherein the first electrode is effective to react with oxygen in the air in the housing to produce at least one electron;
a sensor disposed so as to be effective to detect a reaction of the tantalum vanadium boron component and oxygen in the housing, the sensor effective to generate a reaction signal in response to the reaction; and
a processor in communication with the sensor, wherein the processor is effective to receive the reaction signal and generate an indication based on the reaction signal, wherein the indication indicates whether a charge of the battery is below a threshold.

18. The rechargeable battery system of claim 17, wherein the tantalum vanadium boron component includes $TaVB_2$.

19. The rechargeable battery system of claim 17, wherein the sensor includes at least one of an oxygen sensor, a pressure sensor, or a flow sensor.

20. A method to recharge a rechargeable battery that includes an electrode, the method comprising:
receiving an indication that indicates a charge of the rechargeable battery is below a threshold; and
in response to receiving the indication, exposing the electrode, which includes a tantalum vanadium boron component, to light from a light source through a hole in a wall of a housing of the rechargeable battery so that the electrode is effective to react with oxygen to produce tantalum oxide and the light is effective to disassociate the oxygen from the tantalum vanadium boron component.

21. The method as recited in claim 20, wherein exposing the electrode, which includes the tantalum vanadium boron component, includes exposing $TaVB_2$.

22. The method as recited in claim 20, further comprising:
  detecting, by a sensor, a reaction of the tantalum vanadium boron component and oxygen in the housing;
  generating, by the sensor, a reaction signal in response to detecting the reaction;
  receiving, by a processor in communication with the sensor, the reaction signal; and
  generating, by the processor, the indication based on the reaction signal.

23. The method as recited in claim 22, wherein detecting includes detecting with at least one of an oxygen sensor, a pressure sensor, or a flow sensor.

* * * * *